United States Patent

[11] 3,614,477

[72] Inventor Henry F. Liebman
Plantation, Fla.
[21] Appl. No. 779,113
[22] Filed Nov. 26, 1968
[45] Patented Oct. 19, 1971
[73] Assignee The Bendix Corporation

[54] FIELD EFFECT TRANSISTOR SHUNT SQUARING NETWORK
9 Claims, 1 Drawing Fig.

[52] U.S. Cl. .......... 307/279, 307/251, 307/268, 307/288
[51] Int. Cl. .......... H03k 3/26
[50] Field of Search .......... 307/251, 255, 279, 246, 268, 304, 288; 328/151, 166

[56] References Cited

UNITED STATES PATENTS

| | | | |
|---|---|---|---|
| 3,495,096 | 2/1970 | Blachowicz et al. .......... | 307/251 X |
| 3,348,053 | 10/1967 | Cantor .......... | 328/151 X |
| 3,348,157 | 10/1967 | Sullivan et al. .......... | 328/166 X |
| 3,392,341 | 7/1968 | Burns .......... | 307/304 X |
| 3,426,283 | 2/1969 | Thor .......... | 328/166 |
| 3,457,435 | 7/1969 | Burns et al. .......... | 307/304 X |
| 3,465,171 | 9/1969 | Moses .......... | 307/246 X |

*Primary Examiner*—John S. Heyman
*Attorneys*—Plante, Arens, Hartz, Hix and Smith, Bruce L. Lamb, William G. Christoforo and Lester L. Hallacher

ABSTRACT: A squaring network wherein an input signal wave appearing on a signal line and having a peak value occurring at a repetition frequency equal to a pulse repetition frequency of a reference square wave is shaped into a square wave. A pair of oppositely poled field effect transistors shunt the signal line alternately to one and then another signal storage capacitor in response to the reference square wave.

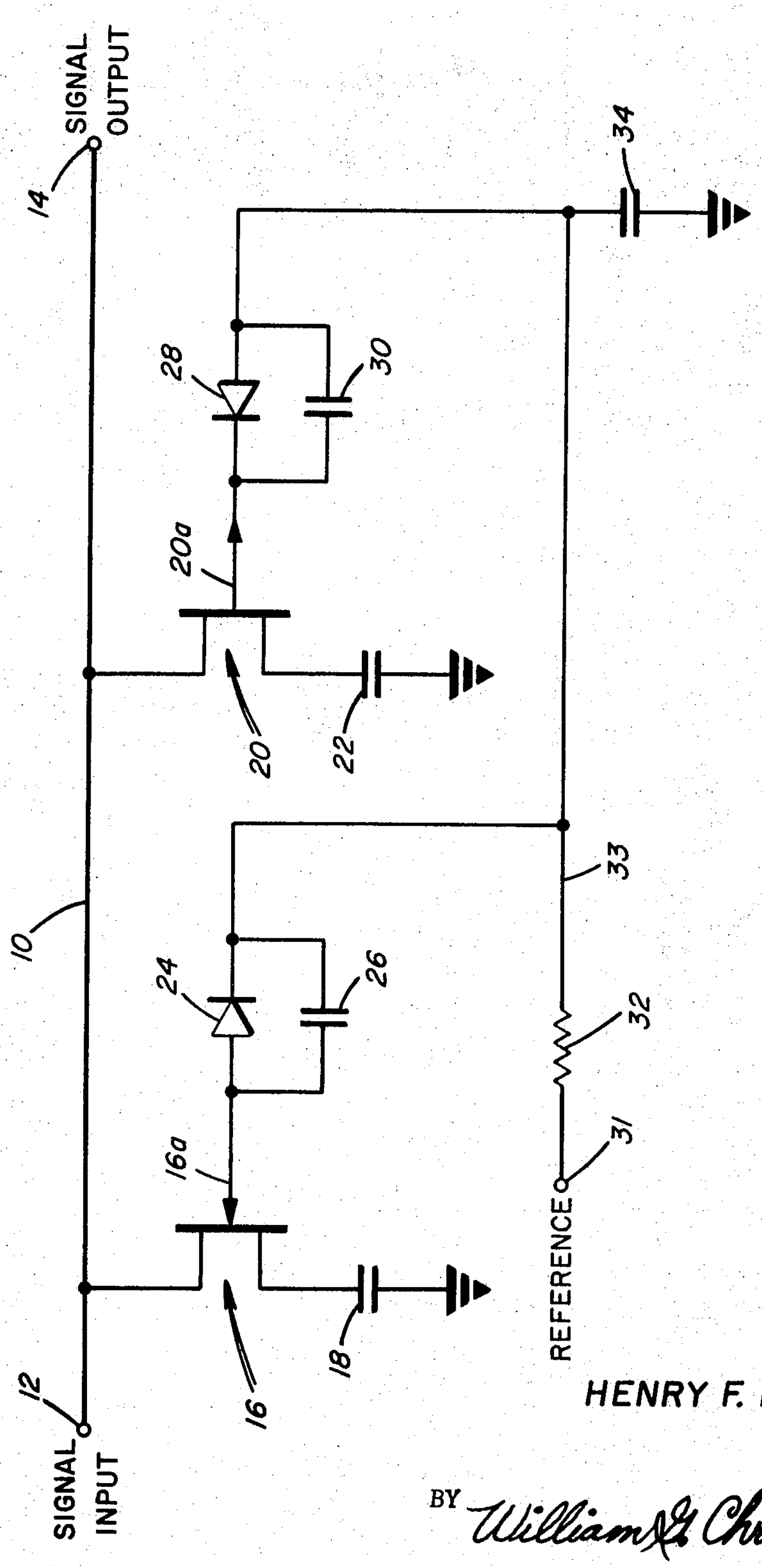
INVENTOR
HENRY F. LIEBMAN
BY William G. Christoforo
ATTORNEY

FIELD EFFECT TRANSISTOR SHUNT SQUARING NETWORK

BACKGROUND OF THE INVENTION

This invention relates to squaring networks employing solid-state semiconductor switching devices and, more particularly, to squaring networks utilizing field effect semiconductors as switches.

There are many instances in which a distorted repetitive electrical wave must be squared before it can be properly processed further. One example of such a distorted wave is the gyro signal generated in automatic pilot systems for aircraft. In many modes of autopilot operation, nulling of the signal from the gyro is mandatory, thus necessitating a shaping of the distorted gyro output signal into a clean square wave shape. Other applications requiring the cleaning up of a distorted wave should readily come to mind. The main limitation of the invention, as will be shown below, is that the signal wave requiring squaring is to have peak values occurring at the pulse repetition frequency of a reference square wave.

In the case of an autopilot system, the gyro generates a train of amplitude-modulated waves in response to external stimulus such as the attitude of the aircraft. After the wave train is shaped, it is applied to a correcting mechanism to maintain the aircraft at a desired attitude. It is also often desirable that reaction to severe changes in a control stimulus be attenuated somewhat or slowed down to prevent overreaction, which in the case of an autopilot would produce violent and dangerous movement of the aircraft.

SUMMARY OF THE INVENTION

It is thus an object of this invention to provide a squaring network for input signal waves having peak values occurring at the pulse repetition frequency of a reference square wave.

It is another object of this invention to provide a squaring network utilizing field effect semiconductors as switching elements.

Another object of this invention is to provide a squaring network of the type described which can be made, at the network designer's option, to react rapidly or slowly to changes in the input signal wave.

Solid-state devices used in switching networks, transistors for example, have offset voltages such as the PN junction potentials and thermal noise potentials and voltages induced by reverse currents and interelectrode capacitance effects. These all contribute somewhat to a loss of the original signal strength as the signal moves through the switch. The use of field effect semiconductors, particularly transistors, as the switching elements in this unique squaring network reduces the input signal losses due to the switching elements' resistance at saturation, thus resulting in minimum loss of signal strength. It is thus one further object of this invention to provide a network for squaring an input signal which will result in only minimum loss of signal strength.

These and other objects of the invention will become apparent to one skilled in the art by a reading and understanding of the nature, principles, and details of the invention as disclosed herein.

BRIEF DESCRIPTION OF THE DRAWING

The FIGURE is a schematic of the invention.

DESCRIPTION OF THE PREFERRED EMBODIMENT

With reference to the FIGURE, a signal line 10 having an input terminal 12 on one end, on which is impressed a distorted square wave which it is desired to square and at the other end an output terminal 14, is shunted to a voltage source, which, for convenience, is taken as ground, by the source-drain circuit of field effect transistor (FET) 16 and capacitor 18 and by the source-drain circuit of FET 20 and capacitor 22. FET 16 and 20 are oppositely poled, that is, one FET, namely FET 16, is an N-channel type while the other, FET 20, is a P-channel type. In response to a reference square wave on switching line 33 the FET's are alternately, and oppositely from one another, saturated and turned fully off.

A reference square wave is impressed on terminal 31. This reference square wave is synchronized with the input signal by way of the well-known means. For example, square wave generators are known which can be synchronized directly by synchronizing information derived from a distorted wave such as the input signal in this example. Another and simpler means of obtaining a reference square wave which is synchronized with an input signal where the circumstances permit is the case where the square wave reference signal is applied to the means which is generating the input signal in response to some external stimulus, as previously mentioned, plus the square wave reference. If this is the case and the square wave reference is available at the squaring network it is, of course, applied to the reference input terminal 31 since it is of necessity already synchronized with the input signal on terminal 12.

Resistor 32 and capacitor 34 comprise a filtering circuit which will remove any high-frequency noise from the flat portions of the reference square wave. The time constant of this filtering circuit is very much less than the pulse repetition frequency of the reference square wave so that the filtering circuit introduces only insignificant delays in the switching of FET's 16 and 20 while still providing noise isolation for these transistors.

The gate of FET 16 is connected to switching line 33 through the parallel combination of diode 24 and capacitor 26 while the gate electrode of FET 20 is connected to switching line 33 through the parallel combination of diode 28 and capacitor 30. In operation, positive-going excursions of the reference square wave pass through diode 28 to gate electrode **20*a*, thus biasing FET 20 into a conductive state while negative-going excursions of the reference square wave pass through diode 24 to gate electrode 16*a*, thus biasing FET 16 conductive. Capacitors 26 and 30 are needed to allow the charge on gate electrodes 16*a* and 20*a*, respectively, to build up more rapidly than would the diode alone, when the reference square wave changes value. Additionally, diode 28 in the case of negative-going excursions of the reference square wave, and diode 24 in the case of positive-going excursions of the reference square wave, protect FET's 20*a* and 16*a* respectively from the harmful effects of a full reversed polarity signal on their respective gates. Capacitors 26 and 30 are of like value to one another and slightly less than the capacitance of capacitor 34, thus allowing practically short-circuited connection between gate electrodes 16*a* and 20*b* and switching line 33** for the passage of high-frequency components of the square reference wave.

When used as a switch, as in the present invention, a FET when off shows an open circuit between the source and drain electrodes with practically zero leakage current. When saturated, however, there is a low impedance connection between the source and drain electrodes. When its associated FET is saturated, a storage capacitor, either capacitor 18 or 22, receives or delivers current to signal line 10 depending on whether the signal line voltage is more or less than the capacitor voltage. The IR drop across the saturated FET will result in some loss of signal strength; however, this loss will be minimal due to the aforementioned low-impedance connection between the source and drain electrodes.

During the first few cycles of the input signal capacitors 18 and 22 are being charged to the input signal peaks. This charging time can be controlled by controlling the value of capacitance of capacitors of 18 and 22 and determines whether the squaring network will rapidly follow changes in the input signal or whether the squaring network will delay the effect of changes in the input signal. Generally small values of capacitance allow the squaring network to follow changes in the input signal closely while large values of capacitance cause the squaring network to delay its response. More particularly, the charging time of either capacitor 18 or 22 from line 10 depends upon its capacitance, the impedance of the signal source at point 12, and the saturated resistance of its associated FET. The discharging time of capacitors 18 and 22, because the same source provides the discharge path, is the same as the charge time. The result is well-defined square wave output upon output terminal 14, the output square wave tending to have a magnitude equal to the peak value of the input signal. Having thus described the preferred embodiment of my invention, I hereby claim the subject matter including modifications and alterations thereof encompassed by the true scope and spirit of the appended claims.

The invention claimed is:

1. An electrical squaring network comprising:

a signal line having an input terminal at one end upon which an input voltage signal having peak voltage values is impressed and an output terminal;

first and second voltage sources;

a first charge storage element having two ends, one said end being connected to said first voltage source;

a second charge storage element having two ends, one said end being connected to said second voltage source;

a first field effect semiconductor having a first bilateral current path for coupling said signal line to said first charge storage element other end when in a first conductive state and for disconnecting said first bilateral current path when in a nonconductive state;

a second field effect semiconductor having a second bilateral current path for coupling said signal line to said second charge storage element other end when in a conductive state and for disconnecting said second bilateral current path when in a nonconductive state, said second field effect semiconductor being oppositely poled from said first field effect semiconductor; and, means coupled to said first and second semiconductors for controlling the conductive states thereof synchronously with said peak voltage values.

2. The switching network recited in claim 1 wherein said first and second charge storage elements comprise first and second capacitors.

3. The switching network recited in claim 1 wherein said means for controlling the conductive state of said field effect semiconductors comprises means synchronized with said input voltage signal for generating a reference square wave.

4. An electronic squaring network comprising:

a signal line having an input terminal at one end on which an input voltage signal having peak voltage magnitudes is impressed and an output terminal;

a first voltage source;

a second voltage source;

a first charge storage element having two ends, one said first element end being connected to said first voltage source;

a second charge storage element having two ends, one said second element end being connected to said second voltage source;

a first field effect transistor having a source-drain circuit connected between said signal line and said first charge storage element second end and having a first gate electrode means;

a second field effect transistor having a source-drain circuit connected between said signal line and said second charge storage element other end and having a second gate electrode means; and, means running synchronously with said peak values for alternately energizing said first and second gate electrode means.

5. An electronic squaring network as recited in claim 4 wherein said first and second charge storage elements comprise first and second capacitors.

6. An electronic squaring network as recited in claim 5 wherein said first and second field effect transistors are oppositely poled and said energizing means comprises a square wave generator synchronized with said input signal.

7. An electronic squaring network as recited in claim 6 wherein said square wave generator includes a reference terminal upon which a reference square wave is generated and wherein said first gate electrode means comprises:

a first gate electrode;

a third capacitor for coupling said first gate electrode to said reference terminal;

a first diode for shunting said third capacitor; and, wherein said second gate electrode means comprises;

a second gate electrode;

a fourth capacitor for coupling said second gate electrode to said reference terminal; and, a second diode, oppositely poled from said first diode, for shunting said fourth capacitor.

8. An electronic squaring network as recited in claim 7 with additional filter means connected to said reference terminal for removing undesired frequency components from said reference voltage square wave.

9. An electronic squaring network recited in claim 8 wherein said first and second voltage sources comprise a single voltage source.